UNITED STATES PATENT OFFICE.

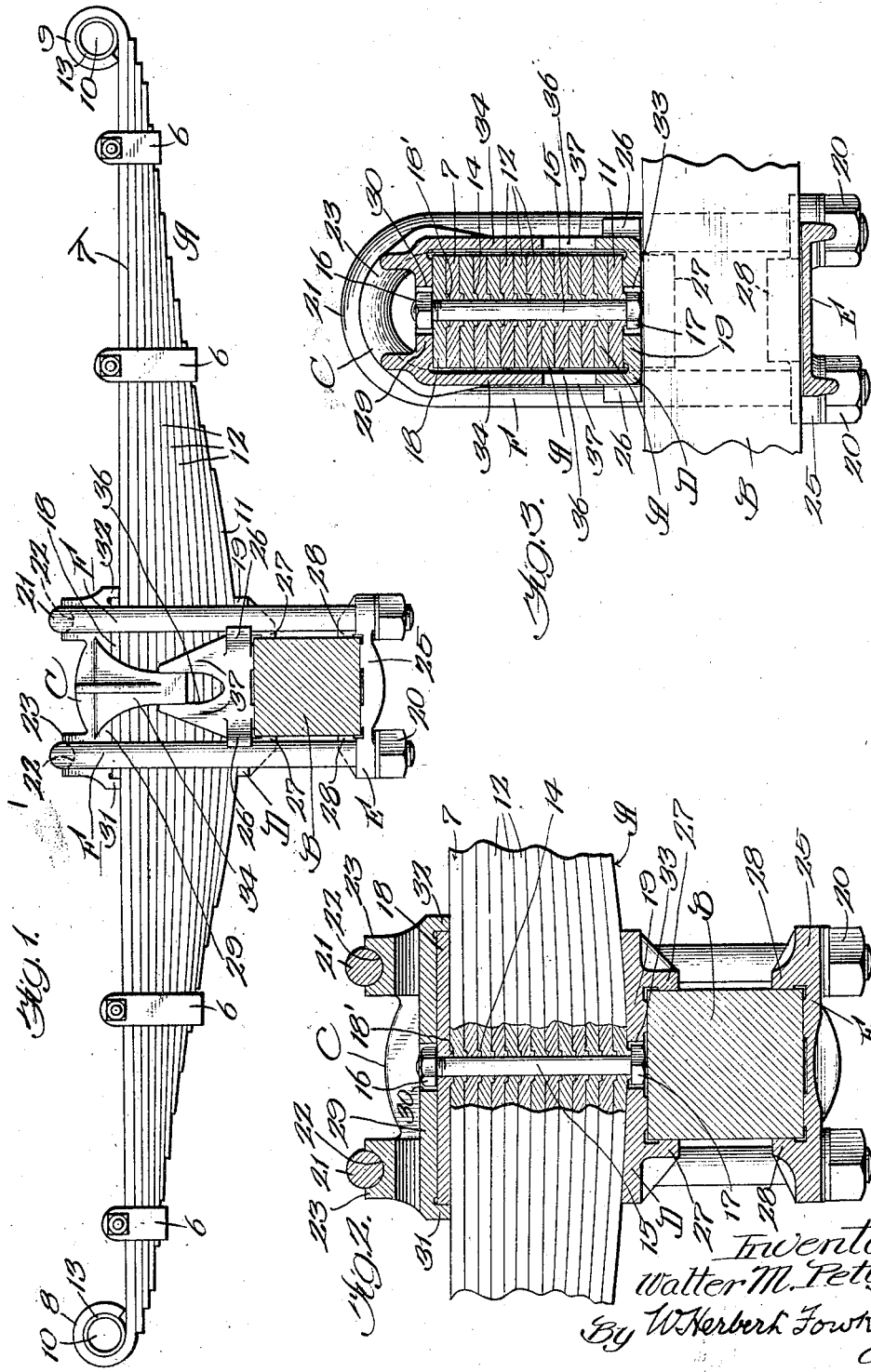

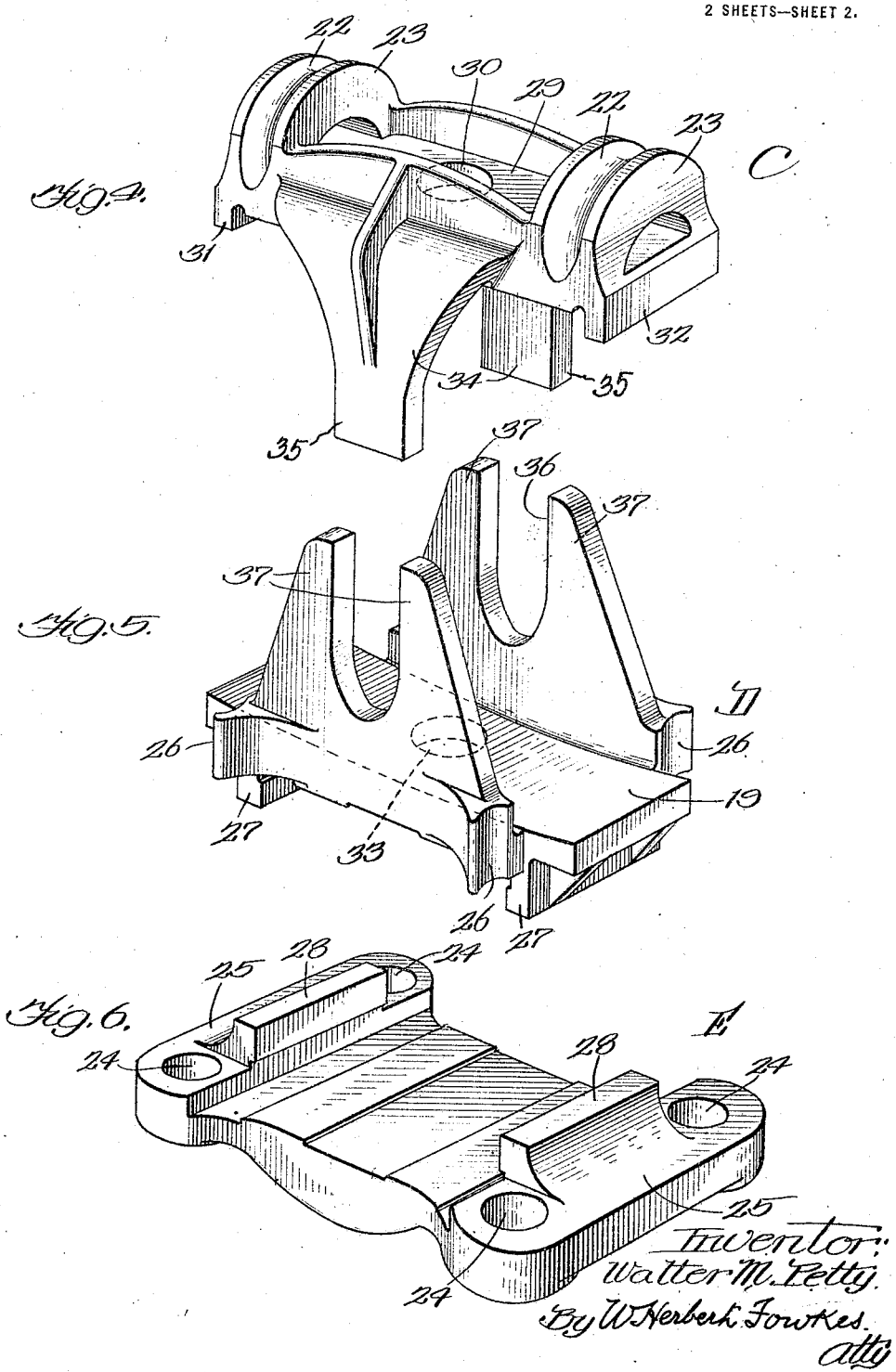

WALTER M. PETTY, OF WABASH, INDIANA, ASSIGNOR TO SERVICE MOTOR TRUCK COMPANY, OF WABASH, INDIANA, A CORPORATION.

MOTOR-VEHICLE SPRING.

1,377,430.      Specification of Letters Patent.      Patented May 10, 1921.

Application filed September 4, 1919. Serial No. 321,603.

*To all whom it may concern:*

Be it known that I, WALTER M. PETTY, a citizen of the United States, and residing at Wabash, county of Wabash, and State of Indiana, have invented certain new and useful Improvements in Motor-Vehicle Springs, of which the following is a specification.

My invention relates in general to springs for motor vehicles as trucks and the like, and has reference more particularly to the Hotchkiss drive type of truck, the principal object being to provide a means capable of transmitting tractive thrust from the axle directly to the main leaf of the spring, and thence to the chassis of the truck during truck movement. It has heretofore been a customary practice to organize the laminæ of a spring of this type so that the central body portions thereof are detachably joined together, as for example in a cup center type of spring the leaves are each formed on one face with a boss and on the other face with a corresponding cup whereby the boss on the one leaf fits into the cup of the next leaf throughout the series composing the spring. While a coupling means was provided, yet the tractive effort or thrust was transmitted through all of the leaves to the main leaf. In other words the other leaves were relied upon as a part of the drive. In such a case, however, any variation that might exist at the cups would obviously be multiplied throughout the spring to an extent depending upon the number of leaves employed. This variation in the aggregate has been found to be of such a material character as to produce relative leaf slippage or spring deflection, which in turn resulted in the spring clips working loose and the placing of the center bolt under lateral stresses tending to break it.

In providing the thrust means previously referred to as being an object of the invention, it is my chief aim in transmitting the drive from the axle to the main leaf to relieve the other leaves of such thrust, or of transmitting such thrust, and thus eliminating the disadvantages above set forth. Differently stated, the invention contemplates the provision of a thrust transmission means designed more especially for interposition in a Hotchkiss drive whereby the efficiency and utility of such a drive is very materially increased. Another object of the invention is to produce a means of this sort capable of application to the usual spring construction, said means in the present instance taking the form of a housing for the central body portion of the spring and comprising coöperating locked members, one of which is associated with the main leaf and the other with the axle or other tractive member.

The invention further contemplates the provision of certain novel details of construction, combination and arrangement of the various parts, as will be hereinafter fully described and pointed out in the claims.

These, together with such other objects and advantages as may be hereinafter set forth, or as are incident to my invention, I attain by means of a preferred construction illustrated in preferred form in the accompanying drawings, wherein:

Figure 1 is a view in side elevation of a spring and axle to which the housing is shown applied, the spring being shown under load;

Figs. 2 and 3 represent cross-sectional views taken through the housing, axle and spring of Fig. 1; and, Figs. 4, 5 and 6 are perspective views of the pressure block, upper axle pad or thrust block, and the lower axle pad or seat, respectively.

Referring to the drawings, the reference character A denotes the vehicle spring provided with spring clips 6 and whose main leaf 7 is terminally formed with a front eye 8 and a rear eye 9, both of which may be connected to the frame of the chassis (not shown) by any suitable attaching means, as by the eye bolts 10 which are shown bushed at 13. The base leaf is designated by the numeral 11 and the intermediate leaves by the numeral 12.

The spring, as will be apparent in the present instance, is of the cup center type, each leaf having its underface preferably formed with a depressed boss or abutment 14 adapted to be received in a corresponding cup-shaped recess formed in the next adjacent leaf, as in the manner shown. If desired, a tie bolt 15 may be provided to extend in the vertical direction through the leaves and the top plate 18, said bolt being secured in place by means of the nuts 16 and 17, the nut 16 engaging the upper face of said plate. This plate 18 is similarly formed with a boss 18′ which fits snugly into the cup provided in the upper face of the main leaf 7, and is, in this way, fixedly engaged with said leaf so as to transmit thereto the drive thrust emanating from the axle B, which thrust is carried in the vertical direction and then horizontally through the instrumentality of the parts of the spring housing now to be described.

The housing proper consists of a pressure block C, and an upper axle pad or thrust block D having its main body portion 19 interposed between the axle B and the lower spring leaf 11, and these parts coöperate with the lower axle pad E which serves as a seat for the axle, the parts being held in fixed relation by means of the two U-bolts F and nuts 20. The curved portions 21 of the bolts are engaged in arcuate seats 22 depressed in the flanged portions 23 of the pressure block C, and their ends are passed through bolt-holes 24 formed in the marginal portions 25 of the pad E. Outwardly projecting arcuate seats 26 are provided to engage intermediate portions of both bolts. The opposed faces of the thrust block D and axle pad E are constructed so as to receive between them the axle B and are respectively formed with side flanges 27 and 28 designed to grip the sides of the axle whereby to prevent lateral displacement of the same. The pressure block has its web 29 apertured at 30 to receive the nut 16 and this web has its ends formed to provide flanges 31 and 32 which are turned downwardly to engage the ends of the top plate 18. Similarly the nut 17 is received within an aperture 33 formed in the body portion 19 of the pressure block D, the upper face of such body portion having a curvature corresponding with that of the lower spring leaf so as to serve as a seat for the same when the parts are coupled together by the U-bolts.

One of the salient features of the invention resides in the rigid connection which is provided between the thrust block and the pressure block, whereby the drive thrust is transmitted vertically and then horizontally to the main leaf so as to relieve the other leaves 11—12 and the bolt 15 against the action of such thrust, and thereby eliminate slippage and the disadvantages resulting therefrom. This connection, as shown, takes the form of the side members 34 which extend downwardly at opposite sides of the spring as integral extensions of the web 29 of the pressure block C, and terminate in end portions 35 each of which is removably seated in a groove or slot 36 formed by the furcations or arms 37. These latter are in turn extended integrally from side margins of the body portion 19 of the pressure block D, at opposite sides of the spring, whereby their confronting inner faces engage the outer parallel side faces of said end portions 35 and thereby transmit the thrust to the pressure block by means of such engagement.

Irrespective of the direction of travel of the vehicle, it will be apparent that this thrust is thereupon transmitted through the pressure block flanges 31 and 32 to the top plate 18 and thence to the main leaf of the spring because of the cup seat connection therebetween. This connection is maintained by means of the U-bolts F, the latter also serving to secure the other parts in their operative relation.

In view of the fact that the other leaves 11 and 12 are relieved from transmitting thrust it follows that the bolt 15 also has no such function, consequently with the parts positioned and maintained as described it is deemed obvious that should the bolt break, by reason of any inherent defect, or otherwise, such failure would not in any way effect the functioning or the mechanical integrity of either the housing or spring. The entire device is simple and effective, and may be readily applied to standard springs in trucks of the Hotchkiss drive type. Other advantages will be apparent to those skilled in this art.

I claim:

1. The combination with a frame, an axle, and a leaved spring whose main leaf is terminally associated with the frame, of a plate secured to said main leaf, a housing for the spring comprising a part engaging said main leaf and said plate at the ends thereof and embracing the sides of said spring, and another part engaging the axle and telescopically engaged with said first mentioned part, and means for securing the housing to the axle, said parts co-acting to directly transmit tractive thrust from said axle to said main leaf and said frame.

2. In a structure of the character described, the combination with a frame, an axle, and a leaved drive spring whose main leaf is adapted to transmit tractive thrust to said frame, of a top plate disposed centrally upon the main leaf and formed with a boss seated in said main leaf, a pressure block seated on said top plate and terminally flanged to engage it, a thrust block interposed between the axle and the spring and having a tongue and groove connection with the pressure block at each side of the spring whereby said blocks transmit thrust from the axle to the top plate and main leaf, a seating block for the axle, and U-bolts connecting said blocks.

3. In structure of the character described, the combination with a frame, an axle, and a leaved drive spring whose main leaf is adapted to transmit tractive thrust to said frame, of a top plate disposed centrally upon the main leaf and formed with a boss seated in said main leaf, a pressure block seated on said top plate and terminally flanged to engage it, a thrust block interposed between the axle and the spring and having a tongue and groove connection with the pressure block at each side of the spring whereby said blocks transmit thrust from the axle to the top plate and main leaf, a seating block for the axle, and U-bolts connecting said blocks and disposed at each side of said tongue and groove connection and said axle, substantially as described.

4. In a structure of the character described, the combination of a spring comprising a plurality of superposed leaves, an axle, a thrust block interposed between said axle and said spring having upwardly projecting side walls provided with open-ended slots, a pressure block disposed above said spring and having downwardly projecting side members engaging said slots at the side of said spring, means for transmitting thrust from said pressure block to the upper leaf of said spring, and means for clamping said blocks and spring together.

5. In a structure of the character described, the combination of a spring comprising superposed leaves, a plate disposed above the upper leaf, a pressure block overlying said plate and provided with flanges engaging the ends of said plate, a thrust block beneath said spring, a telescopic connection between said blocks at the sides of the spring, and means for clamping said blocks together.

6. In a structure of the character described, the combination of a spring comprising a plurality of superposed leaves, a block disposed beneath the lower leaf and having upwardly projecting side members, a block disposed above the upper leaf and having downwardly projecting side members engaged with the side members of the lower block at the sides of the spring, thrust transmitting connections between said upper block and upper leaf of said spring, and means for drawing said blocks together to clamp the leaves of said spring therebetween.

7. In a structure of the character described, the combination of a spring comprising a plurality of superposed leaves, a block disposed beneath the lower leaf and having upwardly projecting side members, a block disposed above the upper leaf having downwardly projecting flanges engaging the upper surface of said leaf and downwardly projecting side members engaging with the side members of said lower block at the sides of the spring, and means for clamping said blocks together.

WALTER M. PETTY.